United States Patent [19]

Miyao et al.

[11] Patent Number: 5,387,301
[45] Date of Patent: Feb. 7, 1995

[54] METHOD OF MANUFACTURING A PREPREG

[75] Inventors: Makiji Miyao; Makoto Takezawa, both of Saitama, Japan

[73] Assignee: Tonen Corporation, Tokyo, Japan

[21] Appl. No.: 157,596

[22] Filed: Nov. 29, 1993

[30] Foreign Application Priority Data

Nov. 30, 1992 [JP] Japan .................. 4-343162

[51] Int. Cl.⁶ .................. C09J 5/02; B29B 15/08; B29B 11/16; B29K 105/08
[52] U.S. Cl. .................. 156/179; 156/176; 156/433; 156/247; 156/249; 156/307.4; 156/237; 156/314
[58] Field of Search .......... 156/247, 289, 307.9, 156/307.7, 237, 238, 246, 240, 241, 433, 176, 179, 166, 249, 314; 427/301, 302, 299, 337, 331

[56] References Cited

U.S. PATENT DOCUMENTS

| | | | |
|---|---|---|---|
| 4,372,800 | 2/1983 | Oizumi | 156/314 X |
| 4,543,145 | 9/1985 | Schnell | 156/231 X |
| 4,662,973 | 5/1987 | Gotou | 156/314 X |
| 4,769,202 | 9/1988 | Eroskey | 156/246 X |
| 5,201,979 | 4/1993 | Koba | 156/161 X |

FOREIGN PATENT DOCUMENTS

| | | | |
|---|---|---|---|
| 0035117 | 9/1981 | European Pat. Off. | |
| 1184105 | 7/1989 | Japan | 156/179 |
| 4040892 | 3/1992 | Japan | 156/176 |
| WO89/03406 | 4/1989 | WIPO | |

OTHER PUBLICATIONS

Database WPI, Section CH, Week 9218, Derwent Publications Ltd. Class A11, AN 92-147403 & JP-A-4 089 209 Mar. 1992.

*Primary Examiner*—David A. Simmons
*Assistant Examiner*—Charles Rainwater
*Attorney, Agent, or Firm*—Seidel, Gonda, Lavorgna & Monaco

[57] ABSTRACT

In the prepreg manufacuturing method according to the present invention, at least one of a first and second release papers is coated with a matrix resin having a low viscosity. Reinforcing fibers are supplied in between the release papers and arranged on the matrix resin layer. Then, the reinforcing fibers are impregnated with the matrix resin by heating and pressing the release papers. After separating one of the papers, a room-temperature curing type hardener is applied onto the matrix resin layer to form a high viscosity layer on a surface layer of the matrix resin layer. Thereafter, a cover film is laid over the surface layer to make a prepreg.

20 Claims, 5 Drawing Sheets

METHOD OF MANUFACTURING A PREPREG

BACKGROUND OF THE INVENTION

FIELD OF THE INVENTION

This invention relates to a method of manufacturing a prepreg in which reinforcing fibers are impregnated with a matrix resin and particularly to a prepreg manufacturing method suitable for production of a thick prepreg.

Presently, fiber reinforced composite materials in which reinforcing fibers are hardened together with a matrix resin, have been widely used in various technical fields such as automobiles, airplanes, building materials, sporting goods, etc. Prepregs have extensively been used for manufacturing such fiber reinforced composite material products.

Such a prepreg consists of a flexible sheet in which a fiber reinforced composite resin layer having reinforcing fibers impregnated with a matrix resin is formed in a thin layer on a release paper as a support and then the matrix resin is partially cured in advance. The prepreg, in which reinforcing fibers are preliminarily impregnated with the matrix resin, is covered with a cover film thereon to make it a product, and is stored for later use.

In order to produce the fiber reinforced composite material product by using the prepreg, for instance, a desired number of the prepreg sheets are laminated on a product model. The prepreg laminates are subjected to pressing and heating not only to shape them but also to cure the matrix with the result that the composite material product is easily obtained.

Heretofore, such a prepreg has been manufactured in the following process.

A unidirectional fiber reinforced prepreg will be described by way of example. A matrix resin is coated on a first release paper. The first release paper coated with the matrix resin and a second release paper on which there is no matrix resin coat, are successively fed in between a pair of rollers. Simultaneously, reinforcing fibers are successively supplied in the longitudinal direction of the fibers in between the rollers covering the width of the release paper. The first and second release papers are superimposed and pressed together in such a manner that the reinforcing fibers are unidirectionally arranged on the matrix resin layer. Subsequently, the reinforcing fibers and the matrix resin layer are pressed and heated at the following press and heat section where press rollers and a hot plate are disposed, so that the reinforcing fibers are forced into the matrix resin layer and impregnated with the matrix resin. Simultaneously, the resin is partially cured. Thus, a unidirectional fiber reinforced prepreg is obtained, in which the unidirectionally arranged reinforcing fibers are impregnated with the matrix resin. The obtained prepreg is taken up on a roller after separating the second release paper from the prepreg and then a cover film is applied onto the prepreg to make it a product.

Alternatively, the second release paper, in addition to the first release paper, is coated with the matrix resin. A unidirectional fiber reinforced prepreg in which the unidirectionally arranged reinforcing fibers are impregnated with the matrix resin, is obtained by using the first and second release papers coated with the matrix resin, and impregnating reinforcing fibers with the matrix resin, and then partially curing the resin according to the process described above. Similarly, the obtained prepreg is taken up on a roller after separating one of the release papers from the prepreg and a cover film is applied onto the prepreg to make it a product.

On the other hand it is necessary that the matrix resin should be coated on the release paper in a uniform thickness. Further, from the viewpoint of operational efficiency in uniformly coating the matrix resin it is necessary that the matrix resin should have a viscosity in a predetermined low viscosity range (Vis). For example, a viscosity between 2,000 to 20,000 cp (centipoise) is recommended during coating operation, as shown in FIG. 5 which schematically shows a viscosity-temperature property of the matrix resin. This is particularly required in the case where the matrix resin is thickly coated to manufacture a thick prepreg.

Formerly, the matrix resin had to be used at a high temperature (Ta) for instance, at a temperature between 100° and 110° C. in order to conduct coating operation in the predetermined viscosity range (Vis) since the viscosity of the matrix resin used is relatively high. This increases the constructural burden by requiring a resin temperature maintaining means as part of the coating system.

Therefore, attempts have been made to conduct coating by using the matrix resin which has a relatively low viscosity, the property of which is shown by the straight line B. In this case, the viscosity range (Vis) for coating operational can easily be obtained even if the temperature of the resin is reduced from the temperature (Ta) to a relatively low temperature (Tb), for instance, a temperature between 70° and 80° C.

According to the aforesaid process, the construction of the resin temperature maintaining means of the coating system is made easier. Furthermore the obtained prepreg has reinforcing fibers which are sufficiently and very uniformly impregnated with the matrix resin, since the matrix resin itself has a low viscosity.

However, even if the matrix resin layer into which the reinforcing fibers are embedded is partially cured after the reinforcing fibers are impregnated with the matrix resin, the matrix resin layer exhibits a lower viscosity to the extent that the relatively low viscosity matrix resin is used. Therefore, the matrix resin layer of the prepreg is sticky, so that the cover film applied to the resin layer adheres to the same. This causes disadvantages in that when the fiber reinforced composite material is manufactured, it is difficult to separate the cover film, resulting in interference with the use thereof.

SUMMARY OF THE INVENTION

An object of the invention is to provide a method of manufacturing a prepreg which can be used for production of fiber reinforced composite materials by reducing the tackiness of a matrix embedded layer with reinforcing fibers, preventing a cover film applied onto the matrix layer from adhering to the same, and facilitating the separation of the cover film therefrom.

The above-mentioned object can be accomplished by a method of manufacturing a prepreg in accordance with the present invention. In brief, this invention is a method of manufacturing a prepreg, which comprises coating a release paper with a matrix resin having a low viscosity, supplying reinforcing fibers in between the paper coated with the matrix resin and a release paper with no coat of the matrix resin, impregnating the reinforcing fibers with the matrix resin by heating and pressing the papers while arranging the reinforcing fibers on the matrix resin layer. Subsequently, after separating one of the papers, a room-temperature curing type hardener is coated on a surface of the matrix resin layer to curve the surface of the matrix resin layer. Thereafter, a cover film is laid onto the matrix resin layer.

According to another embodiment of the present invention, in place of said release paper with no coat of the matrix resin, a release paper which is also coated with a low viscosity matrix resin may be employed. In this case, a prepreg may be manufactured in the same method as that described above. Further, instead of using a release paper to be coated with a low viscosity matrix resin, as described above, a resin-coated paper, in which a low viscosity matrix resin layer was formed on a release paper in advance, may be used.

BRIEF DESCRIPTION OF THE INVENTION

DETAILED DESCRIPTION OF THE PREFERRED EMBODIMENTS

Figure 1:
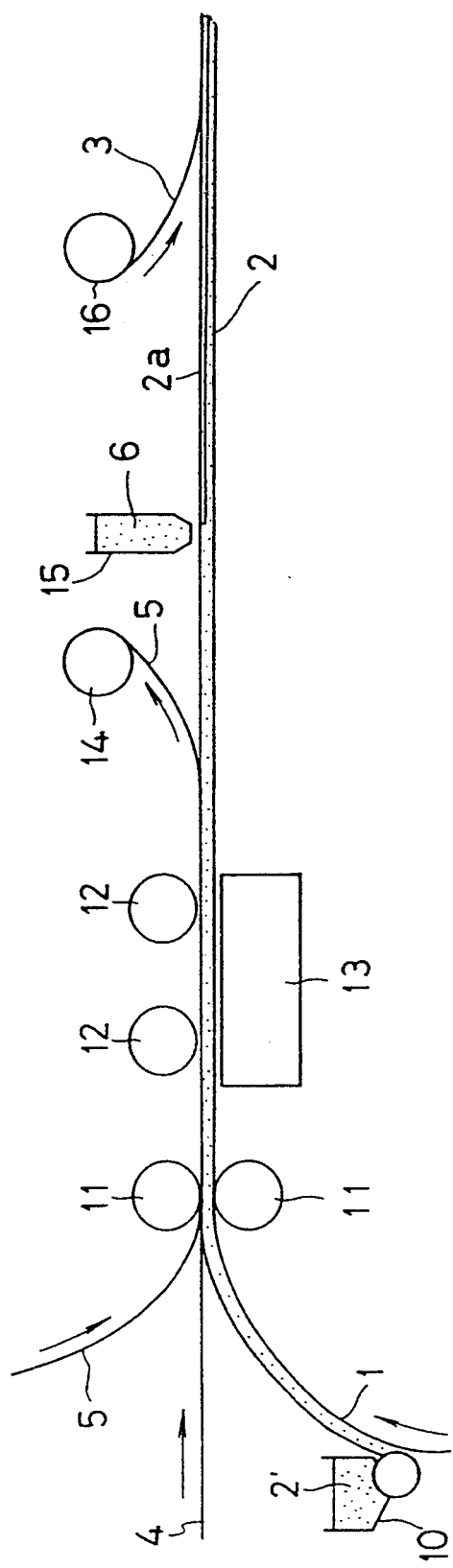
FIG. 1 is a explanatory view showing an embodiment of a prepreg manufacturing method according to the present invention.
Figure 2:
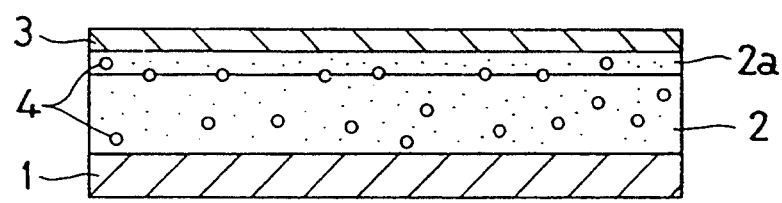
FIG. 2 is a sectional view of a prepreg manufactured by the method of FIG. 1.

FIG. 1 is an explanatory view showing an embodiment of a prepreg manufacturing method according to the present invention. FIG. 2 is a sectional view showing a prepreg obtained by the present method. The prepreg manufactured by the present method comprises a release paper 1 and a low viscosity matrix resin layer 2 containing reinforcing fibers 4 formed on the release paper 1, as shown in FIG. 2. The matrix resin layer 2 is covered with a cover film 3. The surface layer of the matrix resin layer 2 is a high viscosity layer 2a.

A manufacturing method of the present invention will be described. As shown in FIG. 1, a roll coater 10 is disposed on the upstream side of a line for manufacturing a prepreg. A matrix resin 2' is applied by the roll coater 10 onto a first release paper 1 successively supplied from a release paper roller not shown.

According to the present invention, the matrix resin 2' has been prepared such as to have a low viscosity, so that even if a thick coat of the matrix resin 2' on the release paper 1 is required, the coating can uniformly be conducted. Moreover, the reinforcing fibers 4 can sufficiently and uniformly be impregnated with the matrix resin by heating and pressing during the impregnation of the matrix resin.

As for the matrix resin 2', a thermosetting matrix resin such as an epoxy resin, an unsaturated polyester resin, a polyurethane resin, a diallyl phtalate resin, and a phenolic resin may be employed. The matrix resin has a viscosity of 2,000 to 20,000 cp at a coating temperature of 70° C., for example. A curing agent and a curing accelerator are suitably added such that the curing temperature ranges from 50° to 200° C. Moreover, other additives such as an flexibilizer, etc. may be employed.

Citing a preferable example of the matrix resin, an epoxy resin is preferable as the matrix resin. And, one or several of the following epoxy resins are selected for usable matrix resins: for example, (1) a glycidyl ether epoxy resin (bisphenol A, F, S epoxy resin, novolac epoxy resin and brominated bisphenol A epoxy resin); (2) a cyclic aliphatic epoxy resin; (3) a glycidyl ester epoxy resin; (4) a glycidyl amine epoxy resin; (5) a hetero-cyclic epoxy resin; and various other epoxy resins. In particular, bisphenol A, F, S glycidyl amine epoxy resin is suitably used.

As for the curing agent, an amine curing agent such as dicyandiamide (DICY), diaminophenylsulfone (DDS), and diaminodiphenylmethane (DDM); and an acidic anhydride such as hexahydrophthalic anhydride (HHPA), methylhexahydrophthalic anhydride (MHHPA), etc. may be employed, and particularly, the amine curing agent is suitably used.

As for the curing accelerator, imidazole, boric acid ester, Lewis acid, organometallic compound, DCMU, etc. are cited.

Although the thickness of the matrix resin 2' depends on the thickness of the prepreg to be manufactured, the thickness of the matrix resin 2' ranges from 5 to 200 $\mu$m, in general, and from 200 to 300 $\mu$m for a thick prepreg.

The first release paper 1 having the matrix resin layer 2 formed with the resin 2' is fed in between a pair of press rollers 11 disposed on the manufacturing line. Concurrently with this, the reinforcing fibers 4 are successively supplied in the longitudinal direction of the fibers from a fiber supply roller not shown in between the pair of press rollers 11 covering the width of the release paper 1 so that the reinforcing fibers 4 are laid over the matrix resin layer while arranging the fibers in one direction. Moreover, a second release paper 5, which is not coated with the matrix resin, is supplied from a release paper supply roller not shown onto the fibers 4 and laid over the same. The first release paper 1, the reinforcing fibers 4 and the second release paper 5 are then pressed together by the press rollers 11.

As the reinforcing fibers 4, inorganic fibers such as carbon fibers, boron fibers, glass fibers, alumina fibers, silicon carbide fibers and silicon nitride fibers; organic fibers such as aramid fibers, polyarylate fibers and polyethylene fibers; or metal fibers such as titanium fibers, amorphous fibers and stainless steel fibers may optionally be used. These fibers may be used independently or as hybrid fibers obtained by combining the fibers.

Subsequently, the reinforcing fibers 4 are forced into the matrix resin layer 2 to impregnate the fibers 4 with the matrix resin 2 by pressing and heating the reinforcing fibers 4 and the matrix resin layer 2 from the upper and the lower sides thereof at the following heat and press section where a plurality of press rollers 12 and a hot plate 13 facing the rollers are disposed. Simultaneously, the resin 2' is partially cured to thereby obtain a prepreg in which the reinforcing fibers are unidirectionally arranged.

During this impregnation the resin 2' can sufficiently and uniformly be impregnated into the reinforcing fibers 4 by heating and pressing, resulting in the production of a good quality prepreg, since the matrix resin layer 2 is formed of the resin 2' having a low viscosity. However, as the low viscosity matrix resin 2' is employed, the viscosity of the matrix resin 2' is still low after being partially cured, so that the matrix resin layer 2 with the reinforcing fibers 4 is sticky. Therefore, in that state, if the cover film 3 is applied to the matrix resin layer 2, the cover film 3 adheres to the matrix resin layer According to the present invention, after the second release paper 5 is separated by means of a take-up roller 14, a room-temperature curing type hardener 6 is coated on the prepreg at the downstream of the release paper separation section by means of a spray coater 15 with the result that the surface layer of the matrix resin layer 2 is cure to form a high viscosity layer 2a.

As for the room-temperature curing type hardener, aromatic amine, polyamine, etc. may be employed. These curing agents complete their curing reaction for 100 hours at room temperature to cause the surface layer of the matrix resin layer 2 to be weakly hardened. Thus, the high viscosity layer 2a having a viscosity of 2,000,000 to 5,000,000 cp is formed as the surface layer.

Thereafter, the cover film 3 supplied from a film roller 16 is applied to the prepreg to make it a product.

The cover film 3 may employ usual ones, for example, films of such thermoplastic resins as polyethylene, polypropylene, polyethylene terephthalate, polyvinyl chloride, polycarbonate, polyvinylidene chloride, ethyl cellulose, cellulose acetate, etc. The thickness of the cover film 3 is about 5 to 100 μm.

As for the release papers 1 and 5, papers having releasability may be employed as usual. Although the thickness of the paper depends on the thickness of the matrix resin layer, the thickness of the paper preferably is about 20 to 200 μm.

According to the present invention, the prepreg is manufactured by the method described above such that the surface layer of the matrix resin layer 2 with the reinforcing fibers 4 is the high viscosity layer 2a. Thus, the cover film laid over the surface layer does not adhere to the same. Therefore, after easily separating the cover film 3 from the prepreg, the prepreg can be supplied for manufacturing fiber reinforced composite materials. As the high viscosity layer 2a is formed by applying the room-temperature curing type hardener 6 onto the matrix resin layer composed of the low viscosity matrix resin 2', the formation of the high viscosity layer 2 is easy.

Figure 3:
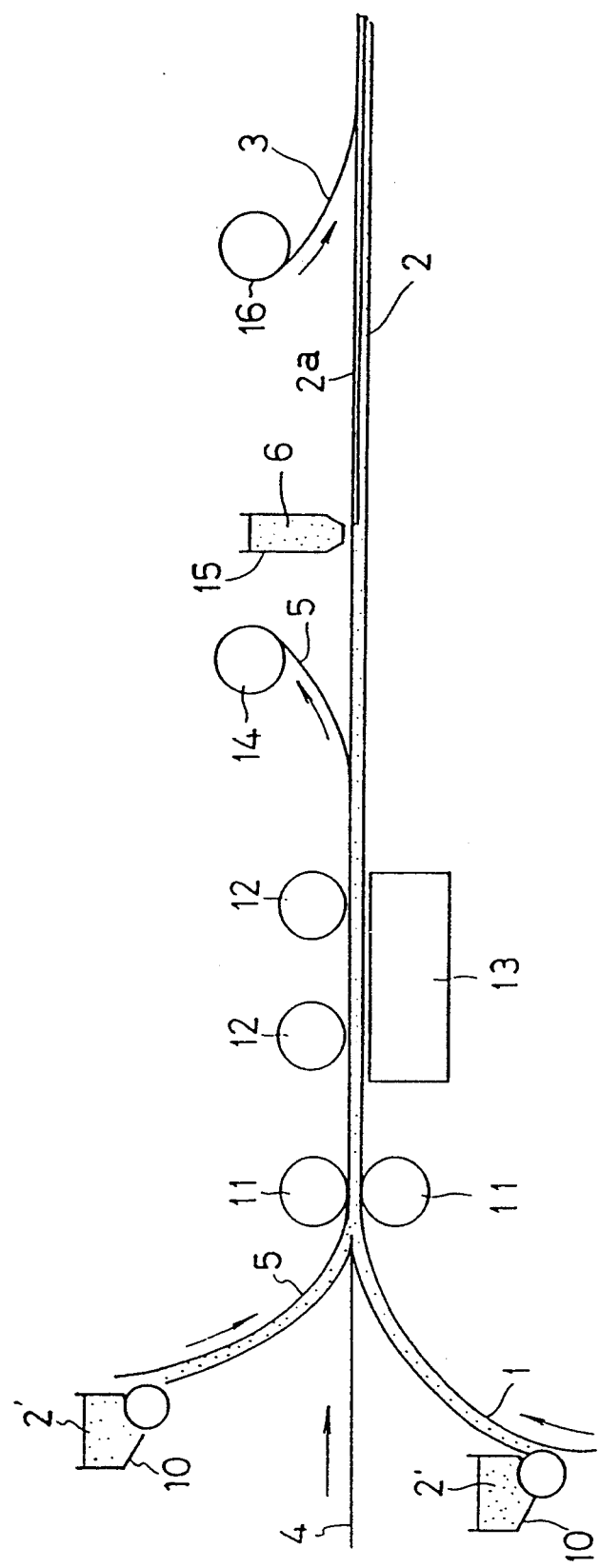
FIG. 3 is a explanatory view showing another embodiment of a prepreg manufacturing method according to the present invention.

FIG. 3 is an explanatory view showing another embodiment of the prepreg manufacturing method according to the present invention. This embodiment is characterized in that, in the embodiment as shown in FIG. 1, the second release paper 5 is also coated with the matrix resin 2' by means of a similar roll coater 10.

A prepreg is manufactured by a method corresponding to the embodiment as shown in FIG. 1. Namely, a first and a second release papers 1 and 2 each having the matrix resin layer 2 formed with the resin 2' is fed in between a pair of press rollers 11. Concurrently with this, reinforcing fibers 4 are successively supplied in the longitudinal direction of the fibers from a fiber supply roller not shown, into the pair of press rollers 11 covering the width of the release papers 1 and 5 so that the reinforcing fibers 4 are disposed between the matrix resin layers while arranging the fibers in one direction. Subsequently, after pressing the reinforcing fibers 4 and the matrix resin layer 2 together, the reinforcing fibers 4 are forced into the matrix resin layer to impregnate the fibers 4 with the matrix resin 2' by pressing and heating the reinforcing fibers 4 and the matrix resin layer 2 from the upper and the lower sides thereof. Simultaneously, the resin 2' is partially cured to thereby obtain a unidirectional fiber reinforced prepreg.

Thereafter, after separating one of the release papers, for instance, the second release paper 5 by the take-up roller 14, the room-temperature curing type hardener 6 is coated on the prepreg by means of the spray coater 15 at the downstream of the separation section. The surface layer of the matrix resin layer 2 is weakly cured to form the high viscosity layer 2a. Then, the cover film 3 supplied from the film roller 16 is laid over the prepreg to make it a product, as previously shown in FIG. 2. This embodiment can provide the prepreg to which the cover film 3 does not adhere, and attain similar effects.

Figure 4:
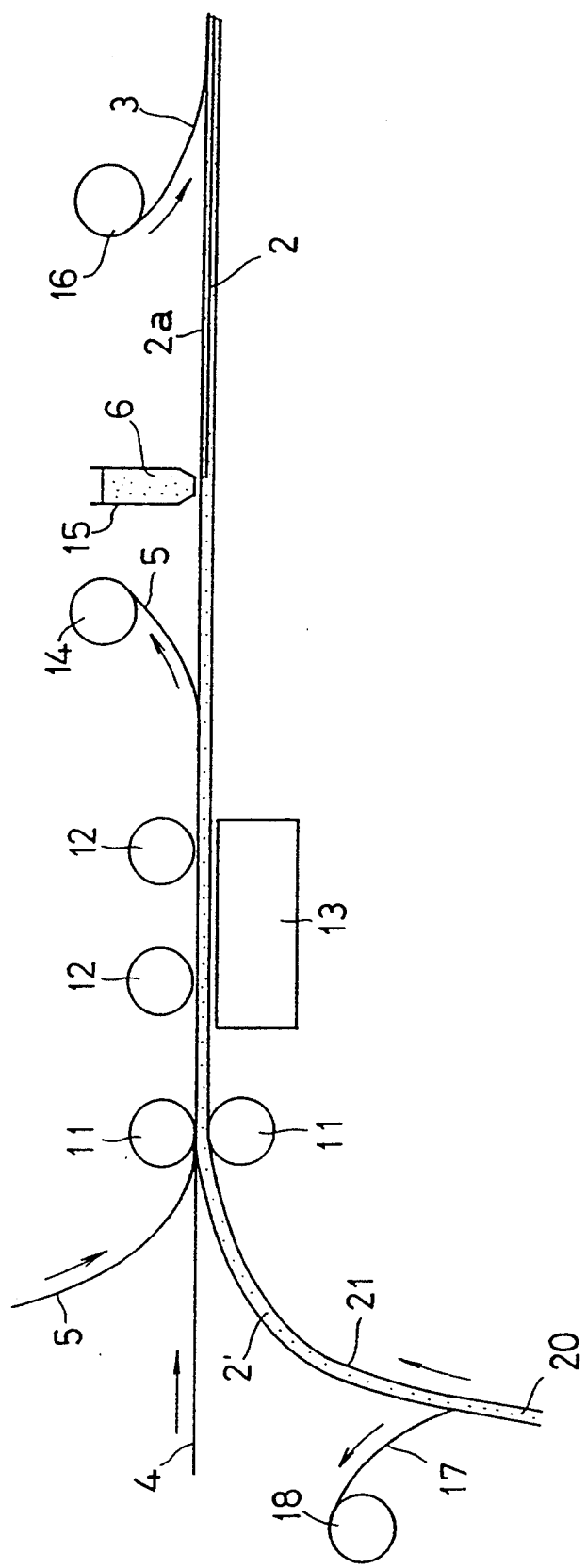
FIG. 4 is a explanatory view showing a further embodiment of a prepreg manufacturing method according to the present invention.
Figure 5:
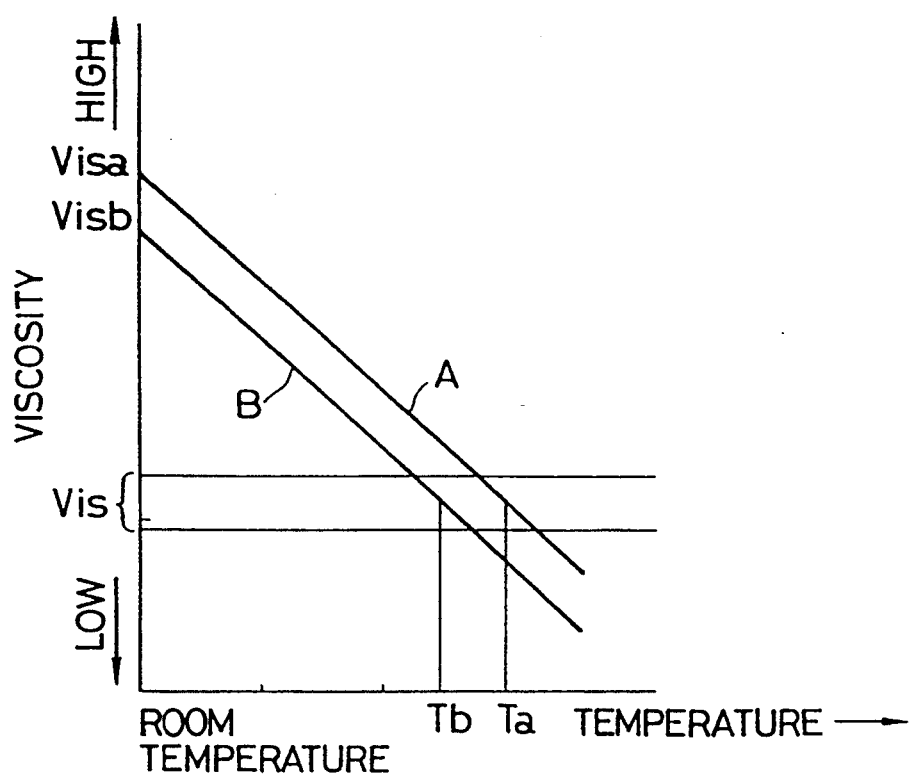
FIG. 5 is a graph schematically showing a temperature-viscosity relationship of the matrix resin.

FIG. 4 is an explanatory view showing a further embodiment of the prepreg manufacturing method according to the present invention. This embodiment is characterized in that, in the embodiment as shown in FIG. 1, a resin-coated paper 20 in which the low viscosity matrix resin 2' has been coated previously on a release paper 21 is substituted for the first release paper 1 which is supplied to the manufacturing process while being coated with the matrix resin 2'.

The resin coated paper 20 is fed in between the pair of press rollers 11 after a cover film 17, which is laid over the matrix resin layer composed of the resin 2', is separated by means of a take-up roller 18. After that, similar processes to those of the embodiment of FIG. 1 are conducted. In FIG. 4, the same reference numerals as those given in FIG. 1 denote the same members.

This embodiment can produce a prepreg to which the cover film 3 does not adhere and attain similar effects.

The embodiments of the present invention will be further described in the nonlimiting examples hereinafter.

EXAMPLE 1

In accordance with the present invention, the prepreg as shown in FIG. 2 was manufactured by the method as shown in FIG. 3.

As regards the first and the second release papers 1 and 5, release papers each having a thickness of 120 μm were used. An epoxy resin (manufactured by Petrochemical Shell Co. Ltd.) as the matrix resin 2' was coated onto each of the release papers 1 and 5 by the respective roll coaters 10. The resin temperature during coating was 80° C. while the density of coated resin was 40 g/m². Dicyandiamide (DICY) as the curing agent was previously added to the epoxy resin. The content of addition was 40 mg/g with respect to the epoxy resin. This caused the curing temperature of the epoxy resin to be 130° C. and the viscosity during coating to be 2,000 cp at a resin temperature of 70° C. A low viscosity epoxy resin layer having a uniform thickness was formed on the release papers 1 and 5.

The reinforcing fibers 4 were supplied in between two sheets of the matrix resin coated release papers 1 and 5 while arranging the fibers 4 in one direction. The fibers 4 and the release papers 1 and 5 were then pressed together by means of the press roller 11. As regards the reinforcing fibers 4, pitch based carbon fibers each having a diameter of 10 μm ("FT700 3K" manufactured by Tonen Corporation) were employed. The reinforcing fibers were arranged in one direction along the length of the fibers in between the epoxy resin layers of the release papers 1 and 5 at a fiber arrangement rate of 3 fibers per unit length (cm) in the direction of the width of the release papers.

After being pressed by the rollers 11, the reinforcing fibers and the release papers were heated at 80° C. by the hot plate 13 and concurrently pressed by the press roller 12 at the pressing and heating section such that the epoxy resin was impregnated into the carbon fibers and partially cured ("B stage").

After the second release paper 5 was separated, polyamideamine (manufactured by Fuji Kasei K.K.) as the room-temperature curing type hardener 6 was coated on the epoxy resin layer with the reinforcing fibers 4 at a rate of 0.4 g per surface area ($m^2$) by means of the spray coater 15. The curing reaction by the hardner was completed in 4 days. As a result, the surface layer of the epoxy resin layer was slightly reacted to make the viscosity be as high as 3,000,000 cp whereby the high viscosity layer 2a was formed on the surface layer to thereby obtain a unidirectional carbon fiber reinforced prepreg.

Subsequently, a polyethylene resin film as the cover film 3 was laid over the prepreg to make it a prepreg product.

As a result, the cover film 3 formed of the polyethylene resin film did not adhere to the epoxy resin layer with the reinforcing fibers. Therefore, the cover film 3 was satisfactorily separated from the resin layer, so that the prepreg was able to be used for manufacturing composite materials.

Comparative Example 1

In Example 1, the room-temperature curing type hardener 6 was not coated on the epoxy resin layer after the epoxy resin layer with the reinforcing fibers was partially cured. Thus, the epoxy resin layer had a low viscosity of 1,000,000 cp at 23° C. Otherwise, the same procedure as in Example 1 was followed to manufacture a prepreg.

As a result, in the obtained prepreg, it was difficult to separate the cover film formed of the polyethylene resin film since the cover film adhered to the epoxy resin layer.

EFFECTS OF THE INVENTION

As described above, according to the present method, the matrix resin is impregnated into the reinforcing fibers and partially cured, and then the room-temperature curing type hardener is coated on the matrix resin layer with the reinforcing fibers whereby the matrix resin layer is cured to make the viscosity of the surface layer of the matrix resin layer high. Therefore, even if there is employed such a low viscosity matrix resin that the matrix resin layer is sticky due to the low viscosity after being partially cured, such stickiness of the matrix resin layer with the reinforcing is removed. A prepreg results which can prevent the cover film from adhering thereto. Accordingly, it is possible to easily separate the cover film from the prepreg and to employ the prepreg for producing fiber reinforced composite materials. Moreover, as the low viscosity matrix resin is employed, the reinforcing fibers are sufficiently and uniformly impregnated within the matrix resin, resulting in the production of a prepreg of high quality.

What is claimed:

1. A method of manufacturing a prepreg comprising:
    coating a release paper with a matrix resin having a low viscosity;
    supplying reinforcing fibers in between said release paper coated with the matrix resin and a release paper which is not coated with the matrix resin;
    impregnating said reinforcing fibers with the matrix resin by heating and pressing the release papers while arranging the reinforcing fibers on the matrix resin layer;
    separating one of the papers;
    subsequently, applying a room-temperature curing type hardener onto a surface of the matrix resin layer to cure the surface layer of the matrix resin layer; and
    thereafter, covering said matrix resin layer with a cover film.

2. The method of manufacturing a prepreg according to claim 1, wherein said matrix resin is a thermosetting matrix resin.

3. The method of manufacturing a prepreg according to claim 1, wherein said room-temperature curing type hardener is an aromatic amine or polyamine.

4. The method of manufacturing a prepreg according to claim 1, wherein said cured surface layer of the matrix resin layer has a viscosity of 2,000,000 to 5,000,000 cp.

5. The method of manufacturing a prepreg according to claim 1, wherein said reinforcing fibers comprise at least one type of fiber selected from the group consisting of inorganic fibers, organic fibers and metal fibers.

6. The method of manufacturing a prepreg according to claim 1, wherein said cover film comprises a thermoplastic resin.

7. A method of manufacturing a prepreg comprising:
    coating a first and a second release papers with a matrix resin having a low viscosity;
    supplying reinforcing fibers in between said release papers coated with the matrix resin;
    impregnating said reinforcing fibers with the matrix resin by heating and pressing the release papers while arranging the reinforcing fibers between the matrix resin layers;
    separating one of the papers;
    subsequently, applying a room-temperature curing type hardener onto a surface of the matrix resin layer and then to cure the surface layer of the matrix resin layer; and
    thereafter, covering said matrix resin layer with a cover film.

8. The method of manufacturing a prepreg according to claim 7, wherein said matrix resin is a thermosetting matrix resin.

9. The method of manufacturing a prepreg according to claim 7, wherein said room-temperature curing type hardener is an aromatic amine or polyamine.

10. The method of manufacturing a prepreg according to claim 7, wherein said cured surface layer of the matrix resin layer has a viscosity of 2,000,000 to 5,000,000 cp.

11. The method of manufacturing a prepreg according to claim 7, wherein said reinforcing fibers comprise at least one type of fiber selected from the group consisting of inorganic fibers, organic fibers and metal fibers.

12. The method of manufacturing a prepreg according to claim 7 wherein said cover film comprises a thermoplastic resin.

13. The method of manufacturing a prepreg according to claim 2, wherein said thermosetting matrix resin is selected from the group consisting of epoxy resins, unsaturated polyester resins, polyurethane resins, diallyl phthalate resins, and phenolic resins.

14. A method of manufacturing a prepreg according to claim 5, wherein the inorganic fibers are selected from the group consisting of carbon fibers, boron fibers, glass fibers, alumina fibers, silicon carbide fibers and silicon nitride fibers;

the organic fibers are selected from the group consisting of aramid fibers, polyarylate fibers and polyethylene fibers;

and the metal fibers are selected from the group consisting of titanium fibers, amorphous fibers and stainless steel fibers.

15. A method of manufacturing a prepreg according to claim 6 wherein the thermoplastic resin is selected from the group consisting of polyethylene, polypropylene, polyethylene terephthalate, polyvinyl chloride, polycarbonate, polyvinylidene chloride, ethyl cellulose and cellulose acetate.

16. The method of manufacturing a prepreg according to claim 8 wherein the thermosetting resin is selected from the group consisting of epoxy resins, unsaturated polyester resins, polyurethane resins, diallyl phthalate resins, and phenolic resins.

17. The method of manufacturing a prepreg according to claim 11 wherein the inorganic fibers are selected from the group consisting of carbon fibers, boron fibers, glass fibers, alumina fibers, silicon carbide fibers and silicon nitride fibers;

the organic fibers are selected from the group consisting or aramid fibers, polyarylate fibers and polyethylene fibers; and the metal fibers are selected from the group consisting of titanium fibers, amorphous fibers and stainless steel fibers.

18. The method of manufacturing a prepreg according to claim 12 wherein the thermoplastic resin is selected from the group consisting of polyethylene, polypropylene, polyethylene terephthalate, polyvinyl chloride, polycarbonate, polyvinylidene chloride, ethyl cellulose and cellulose acetate.

19. A method of manufacturing a prepreg comprising:

supplying reinforcing fibers in between a release paper coated with a low viscosity resin matrix and a release paper which is not coated with the matrix resin;

impregnating said reinforcing fibers with the matrix resin by heating and pressing the release papers while arranging the reinforcing fibers on the matrix resin layer;

separating one of the papers;

subsequently, applying a room-temperature curing type hardener onto a surface of the matrix resin layer to cure the surface layer of the matrix resin layer; and thereafter, covering said matrix resin layer with a cover film.

20. A method of manufacturing a prepreg comprising:

supplying reinforcing fibers in between first and second release papers coated with a low viscosity matrix resin;

impregnating said reinforcing fibers with the matrix resin by heating and pressing the release papers while arranging the reinforcing fibers on the matrix resin layer;

separating one of the papers;

subsequently, applying a room-temperature curing type hardener onto a surface of the matrix resin layer to cure the surface layer of the matrix resin layer; and thereafter, covering said matrix resin layer with a cover film.

* * * * *